July 28, 1953 C. SHEER 2,647,175

ULTRA-WIDE BAND AMPLIFIER TUBE

Filed May 18, 1951 2 Sheets-Sheet 1

INVENTOR.
CHARLES SHEER
BY
Roland A. Anderson
ATTORNEY

July 28, 1953 C. SHEER 2,647,175

ULTRA-WIDE BAND AMPLIFIER TUBE

Filed May 18, 1951 2 Sheets-Sheet 2

INVENTOR.
CHARLES SHEER
BY
Roland A. Anderson
ATTORNEY

Patented July 28, 1953 2,647,175

UNITED STATES PATENT OFFICE 2,647,175

ULTRA-WIDE BAND AMPLIFIER TUBE

Charles Sheer, New York, N. Y., assignor to the United States of America as represented by the United States Atomic Energy Commission Application May 18, 1951, Serial No. 227,067

4 Claims. (Cl. 179—171)

The present invention relates to a method and apparatus for amplifying electrical impulses with an exceptionally short resolution time.

Due to the rapid advance of nuclear physics in recent years, increasingly stringent requirements have been placed upon auxiliary electronic apparatus. The deficiencies of the electronic equipment used in conjunction with high energy particle accelerators have prevented further advances along many lines of nuclear experimentation. The resolution time of the conventional equipment is limited by the vacuum tube amplifier stage having the greatest gain-bandwidth product. The term "gain" of the tube is defined as the ratio between the amplitude of the amplified electrical impulses appearing at the anode to the amplitude of the electrical impulses applied to the grid or control electrode. The term "bandwidth" of the tube is defined as the range of frequencies that can be transmitted through the tube. Thus, if a tube has a gain of 3 and a bandwidth of 1000 megacycles it has a gain-bandwidth product of 3000. In order to amplify extremely sharp electrical impulses without distortion it is necessary that the amplifier tube also amplify all of the frequency components contained in the impulses. The sharper the pulse, the greater the number of frequency components it contains. Therefore, the wider the bandwidth of the tube the sharper the electrical impulses it can amplify. Since the detection circuits of most high energy particle accelerators consist of crystal or scintillation counters, the resulting pulses can be easily amplified by apparatus capable of carrying out the method of the present invention.

It is accordingly an object of the present invention to provide a new and improved amplifier tube having an exceptionally high gain-bandwidth product.

Another object of the invention is to provide a new and improved amplifier tube with a very short resolution time.

Still a further object of the present invention is to provide a new and improved amplifier tube with high transconductance and low interelectrode capacitance.

It is also an object of the present invention to provide a new and improved grid construction for travelling wave amplifier tubes.

Many other objects and advantages of the present invention are in part obvious and in part pointed out hereinafter.

More particularly a preferred embodiment of the apparatus capable of carrying out the present invention includes, in general, the following combination of an elongated cathode, an elongated anode and at least one elongated control electrode disposed in parallel relationship and with the control electrode apportioned into a propagating portion for the impulses to be amplified and a non-propagating portion. Suitable input and ouput connections to the apparatus are provided for the electrical impulses to be amplified.

The many objects and advantages of the present invention may best be appreciated by reference to the accompanying drawings, certain figures of which illustrate apparatus incorporating a preferred embodiment of the present invention and capable of carrying out the method of the invention.

Figure 1:
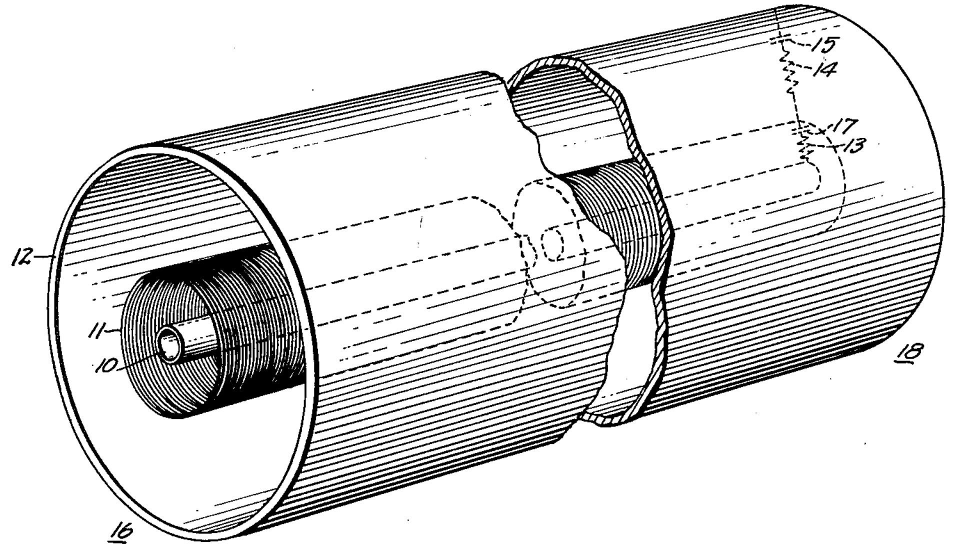
Figure 1 is a perspective view of an illustrative simplified apparatus useful for the purpose of explaining the tube operation.

Referring to Figure 1, wherein is shown the essential elements of the amplifier tube, it will be noted that the combination includes a cylindrical cathode 10, a grid or control electrode 11 and an anode 12. The length of the assembly is large in comparison to the diameter of the anode 12. The cathode 10 is an indirectly heated oxide coated cylinder. Grid 11 is constructed of a fine wire mesh to which a suitable negative potential can be applied to prevent the flow of grid current. Anode or plate 12 is a cylinder made of electrically conductive material which can be maintained at a positive potential with respect to the cathode 10 and the grid 11. Appropriate connections, not shown, can be made to the tube elements for the purpose of supplying operating potentials and the entire assembly can be mounted in a conventional evacuated tube.

The concentric cylinders, cathode 10 and grid 11, constitute a coaxial transmission line whose characteristic impedance is dependent upon the ratio of the grid-to-cathode diameters. If the losses are negligible, this characteristic impedance will be purely resistive at all frequencies in the operating range. This transmission line is shown terminated in a resistor 13. Similarly the concentric cylinders formed by grid 11 and anode 12, constitute a second transmission line terminated by a resistor 14. Blocking condensers 15 and 17 are provided to prevent the direct current operating potentials from reaching the control electrode 11.

In operation, if a uniform potential difference is maintained between grid 11 and cathode 10 along their entire length and the anode 12 is kept at a fixed potential which is positive with respect to the cathode and grid, a constant electron current will flow from the cathode 10 to the anode 12 through the apertures in the grid cylinder 11. If a sinusoidal signal is applied between the cathode and the grid at the input or sending end 16 of the tube, this signal will be propagated along the grid cylinder 11 until it reaches the load resistor 13. If resistor 13 is equal to the characteristic impedance of this transmission line the signal will be completely absorbed and reflections back to the sending end will be prevented. The propagation of this signal along the length of the grid cylinder 11 gives rise to a sinusoidal wave of potential difference between grid 11 and cathode 10. Therefore, at any instant there will be a sinusoidal distribution of potential difference between cathode 10 and the grid 11 along the length of the tube. This sinusoidal distribution of potential difference causes sinusoidal variations in the electron or space current flowing through the grid 11 to the anode 12 resulting in a sinusoidal voltage wave at anode 12. This voltage wave moves towards the receiving end 18 of the tube following the signal on the grid 11. The voltage wave will progressively increase as the result of the in-phase addition of the contribution of successive elements along the grid length. The final output across the load resistance 14 at the receiving end 18 will be considerably larger than the input signal at the sending end 16 if the length of the tube is sufficient. Furthermore under ideal conditions this amplification will be entirely independent of frequency.

In order to make the characteristics of the tube independent of frequency, I have found that the tube parameters should preferably be chosen so that the following conditions are met:

$$L_p = L_g \text{ and } C_p = C_g$$

where $L_p$=the distributed inductance of the plate line 12.
$L_g$=the distributed inductance of the grid line 11.
$C_p$=the distributed capacitance of plate line 12.
$C_g$=the distributed capacitance of the grid line 11.

The above relationships also make the characteristic impedance of the plate line equal to the characteristic impedance of the grid line. This will permit the tubes to be used in cascade without any external impedance transformation.

The use of the above design parameters, although producing desirable tube characteristics, also produces practical difficulties in the construction of the tube. It is well known that the closer the grid is spaced to the cathode the greater control the grid will exercise over the electron current flowing from the cathode. This close spacing provides a high transconductance and in turn a high gain. However, a close grid-to-cathode spacing increases the distributed capacity, $C_g$, of the grid line 11. Therefore, the distributed plate line capacitance, $C_p$, must be increased to remain equal to $C_g$. This decreases the characteristic impedance of the plate line causing a reduction in the gain of the tube. This deleterious effect has been overcome by the novel arrangement to be described hereinbelow with reference to detailed Figure 3.

Figure 2:
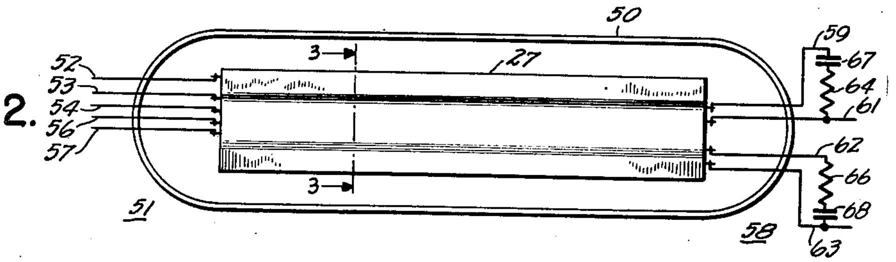
Figure 2 is a plan view of one form of apparatus capable of carrying out the present invention and representing a preferred embodiment.

Referring first to Figure 2, the apparatus for carrying out the present invention is shown mounted in an evacuated envelope 50. The portions of the preferred embodiment of the present invention that are visible in Figure 2 are the outer surface of the anode 27, the input and output connections to the tube, and the terminating resistors 64 and 66. The sending end 51 of the tube contains the following connections: conductor 52 is connected to the anode 27; conductor 53 is connected to the grid or control electrode of the tube structure and conductor 54 is connected to the cathode of the tube. Conductors 56 and 57 are connected to the heater element of the tube. At the receiving end, 58, of the tube, conductors 59 and 62 are connected to the grid or control electrode of the tube, conductor 61 is connected to the cathode of the tube structure and conductor 63 is connected to anode 27. The conductors connected to the output or receiving end 58 of the tube are provided for the removal of the amplified output signal, from conductor 63, and for the connections of the terminating resistors. The terminating resistance 64 and blocking condenser 67 of the cathode-grid transsion line can be connected between leads 59 and 61. The terminating resistance 66 and blocking condenser 68 of the grid-anode transmission line can be connected between leads 62 and 63. The connections to the tube structure are made through the evacuated envelope 50 and welded to the tube elements in a conventional manner.

Figure 3:
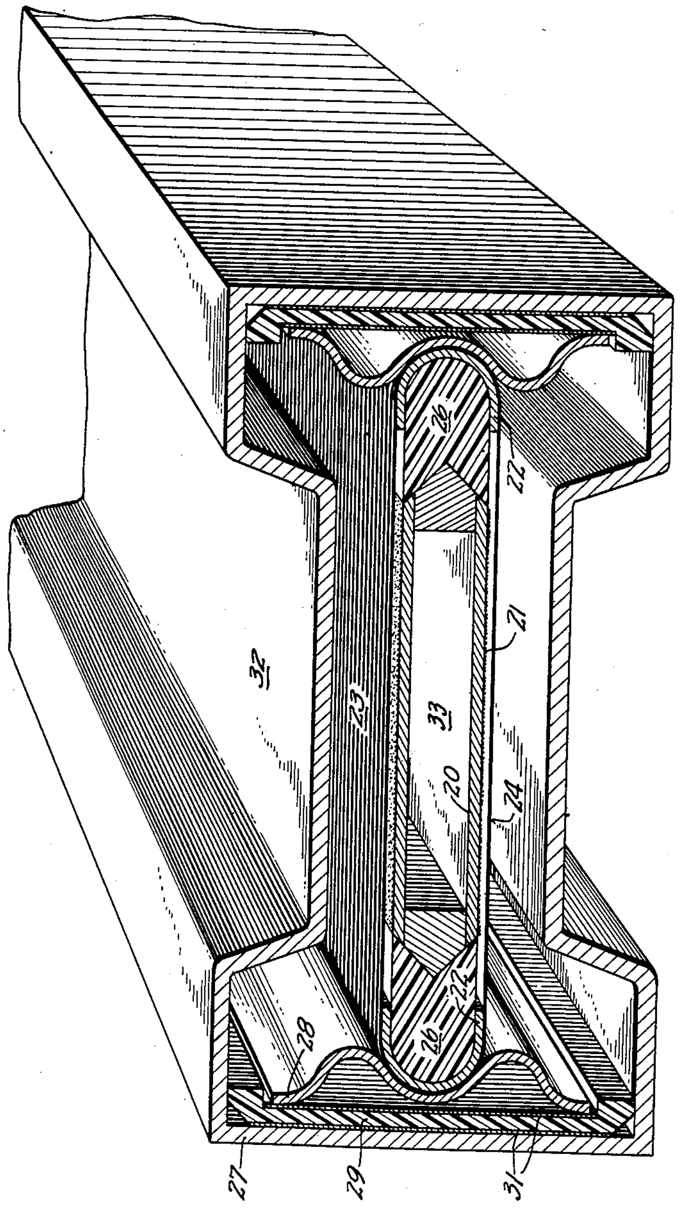
Figure 3 is a perspective view partly in section taken along the line 3—3 of Figure 2 showing the constructional details of a preferred embodiment of the present invention.

In Figure 3, which illustrates a preferred embodiment of the apparatus for employing the present invention, a centrally disposed hollow cathode 20 is made of an electrically conducting material with an emissive coating 21 plated on the exterior thereof. The grid or control electrode of the tube consists of two-semi-cylindrical strips 22 and a grid mesh 23 made up of a fine wire 24 helically wound along the length of the grid strips 22. Grid strips 22 are maintained at a fixed position with respect to cathode 20 by means of grid-to-cathode spacers 26. The grid of the tube is separated from the anode 27 by a grid support spring 28 and a grid-anode spacer 29. Spacer 29 has an electrically conductive coating 31 plated on each of its sides along its entire length. Anode 27 of the tube is made of an electrically conductive material which is generally rectangular in shape except for the reentrant surfaces 32. Surfaces 32 have a purpose which will be described later with respect to the operation of the tube.

The heater for the cathode can be inserted in the space 33 enclosed by the cathode 20. Heater elements of the shape shown in Figure 4 or 5 or any other suitable configuration may be used.

In operation, voltage for the heater element is applied to conductors 56 and 57 and a small negative voltage is applied to the grid electrode by means of conductor 53. A potential which is positive with respect to both the grid and the cathode is applied to the anode 27 by means of lead 52. When the cathode 20 has been heated sufficiently, the emissive coating 21 will emit electrons that are attracted to the anode 27 through the apertures in the grid mesh 23. The electrical impulses to be amplified are applied between conductors 53 and 54 which are connected to the grid strips 22 and cathode 20, respectively. These impulses will be propagated along the length of the grid strips 22. As the grid strips 22 will both have exactly the same potential there will be no transverse current flow therebetween through the grid wires 24 because the potential at both ends of these wires will be equal. However, the wires 24 will attain the potential of that point on the grid strip 22 with which they make contact. The grid mesh 23 therefore will effectively control the electron or space current flowing from coating 21 to the anode 27. Since the grid mesh 23 is preferably mounted very close to the coating 21 it will have a highly effective control on the electron current thereby resulting in a high transconductance and amplification factor. However, the distance between the grid strips 22 and the cathode 20 is much larger than the distance between the grid mesh 23 and the cathode 20. As the grid strips 22 are the only portions of the grid through which the impressed electrical impulse current flows in a longitudinal direction, their distance from the cathode determines the effective grid-to-cathode capacitance of the tube. This results from the fact that the effective capacitance between two parts of a circuit in any heterogeneous system of conductors is determined solely by the existing current distribution in the circuit. In the operation of the embodiment of Figure 3 the current density is high between the grid strips 22 and the wedge shaped ends of the cathode 20. The current density on the grid mesh 23 is zero since no current flows in the wires. Therefore, the portion of the circuit that determines the grid-to-cathode capacitance is the distance between the grid strips 22 and the edges of the cathode 20. Since strips 22 are maintained at a relatively large distance by spacers 26, a low effective grid-to-cathode capacitance will result. If spacers 26 are fabricated from a low dielectric material such as high grade, clear, fused Brazilian rock quartz crystal, the grid-to-cathode capacitance can be kept to a minimum.

The embodiment of the apparatus shown in Figure 3 therefore achieves a very small grid-to-cathode spacing for good grid control and high amplification factor and simultaneously achieves a relatively small effective grid-to-cathode capacitance.

The tube may also be operated with the control electrode maintained at ground potential. When used in this manner, a small positive potential may be applied to the cathode to sustain the proper potential relationship between the grid and cathode, namely keeping the grid negative with respect to the cathode. With the grid operated at ground potential, it provides an effective electrostatic shield for the cathode.

The grid support springs 28 maintain the grid and cathode of the tube in a fixed relationship with respect to the anode 27. The springs are shaped to permit thermal expansion of the grid and cathode structure. The dimensions of the grid-to-anode spacers 29 are selected to provide a distributed plate capacity, $C_p$, that is equal to the distributed grid capacity, $C_g$, determined by spacers 26. The electrically conductive plating 31 that appears on both sides of the spacers 29 is provided to insure good electrical contact between spring 28 on one side and anode 27 on the other side. This prevents local variations of capacitance of the spacer 29 due to small surface changes and variation of contact pressure of spring 28 along its length. The reentrant surfaces 32 are formed in the anode structure to give a closer grid-to-anode spacing where no solid dielectric material is used and to provide optimum tube characteristics.

Another advantage of the structure shown in Figure 3 is that both the impressed signal or impulse current and the amplified anode current are propagated down the length of the tube in a direction parallel to the axis of the tube structure. If there were any transverse or azimuthal components in this current, they would introduce effects altering the propagation characteristics of the transmission line. These effects would be due to the mutual inductance and distributed capacity between adjacent turns of the helical or solenoidal conductor path and would decrease the bandwidth of the tube. Therefore, by causing the tube current to flow only in an axial direction, the apparatus of the present invention eliminates this restriction on the tube bandwidth.

Figure 4:
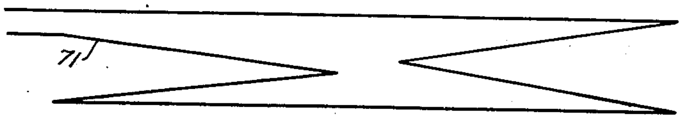
Figures 4 and 5 are diagrammatic plan views showing suitable arrangements of the heater elements of the tube.

Referring to Figure 4 a preferred shape of a heater element 71 suitable for mounting within hollow cathode 20 is shown. This element is of the conventional "hair pin" type. The purpose of the shape is to provide more heating area near the ends of the tube than in the center. This will provide uniform heating of the cathode because the ends of the tube cool off at a faster rate than the center.

Figure 5:
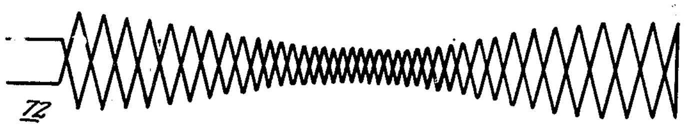

Similarly in Figure 5 a logarithmically wound spiral type of heater element 72 provides less heating surface at the center of the tube than at the ends and may be used as an alternate to the configuration shown in Figure 4.

In one form of assembly, constructed as shown in Figure 3, the use of the following materials and dimensions for the several elements has been found satisfactory. The anode 27, the support springs 28, grid strips 22 and the cathode 20 are all made of molybdenum; spacers 26 and 29 are made of high grade, clear, fused Brazilian rock quartz crystal; tantalum or platinum is used for the electrically conductive plating 31 on spacer 29; either nickel or molybdenum may be used as a base for the emission coating 21 which can be a mixture of barium or strontium oxide; the heater elements are made of tungsten wire coated with a thin insulating layer of Alundum; and the grid wires may be made of tungsten.

Dimensionally, the over-all length of the tube is 8 inches; the over-all width is 0.5 inch; the over-all height is 0.25 inch; the grid-to-cathode spacing is 0.003 inch; the grid-to-plate spacing is 0.041 inch; the spacing between the grid wires is 0.0025 inch; the diameter of the grid wire is 0.0003 inch; the area of the cathode is 1.27 $cm.^2/cm.$ of length; the grid strips are made of 0.005 inch molybdenum sheet; and the grid wire is wound with a pitch of 400 turns per inch.

So far as is known, the best gain-bandwidth product obtained with known tubes in the art today is in the order of 600 mc. In contrast therewith, amplifier tubes based on the design of the apparatus of the present invention are capable of gain-bandwidth products within the range of 3000 mc.–10,000 mc.

While the salient features of this invention have been described in detail with respect to one embodiment it will of course be apparent that numerous modifications may be made within the spirit and scope of this invention and it is therefore not desired to limit the invention to the details shown except insofar as they may be defined in the following claims.

I claim:

1. For use in an apparatus for the amplification of high frequency electrical impulses, an assembly suitable for insertion in a vacuum tube and comprising at least three parallel electrodes, said electrodes including a cathode, an anode and a control electrode, part of said control electrode including two diametrically opposed, spaced, semi-cylindrical strips extending substantially the length of said apparatus and disposed between said cathode and said anode, the remainder of said control electrode including a continuous wire helix wound about said strips and making electrical contact therewith, input means for applying said impulses to one end of said control electrode, whereby the impulses are propagated along the length of said semi-cylindrical strips, each strand of said wire helix serving to control the flow of electrons from said cathode to said anode and output means for removing the amplified impulses from said anode.

2. Apparatus for the amplification of high frequency electrical impulses which comprises a vacuum tube, at least three parallel elongated electrodes mounted within said tube, said electrodes including a cathode, an anode and a control electrode, part of said control electrode including two elongated, diametrically opposed, spaced, semi-cylindrical strips disposed between said cathode and said anode, the remainder of said control electrode including a continuous wire helix wound about said strips and making electrical contact therewith, the distance between said strips and said cathode being relatively large with respect to the distance between the strands of said helix and said cathode, input means for applying said impulses to one end of said control electrode, whereby said impulses are propagated along the length of said semi-cylindrical strips, each strand of said helix serving to control the flow of electrons from said cathode to said anode and output means for removing the amplified impulses from said anode.

3. Apparatus for the amplification of high frequency impulse which comprises in combination a vacuum tube, at least three parallel coaxial electrodes mounted within said tube, said electrodes including a cathode, an anode and a control electrode, part of said control electrode including two diametrically opposed, spaced, semi-cylindrical strips extending substantially the length of said tube and disposed between said cathode and said anode, the remainder of said control electrode including a continuous wire helix wound about said strips and making electrical contact therewith, input means for applying said impulses to said control electrode, whereby the impulses are propagated along the length of said semi-cylindrical strips, each strand of said wire helix serving to control the flow of electrons from said cathode to said anode, output means for removing the amplified impulses from said anode, a terminating impedance connected between said coaxial anode and control electrode, said terminating impedance being equal to the characteristic impedance of said coaxial anode and control electrode and a second terminating impedance connected between said control electrode and said cathode, said second impedance being equal to the characteristic impedance of said coaxial control electrode and cathode.

4. For use in an apparatus for the amplification of high frequency electrical impulses, an assembly suitable for insertion in a vacuum tube and comprising at least three parallel coaxial electrodes, said electrodes including a cathode, an anode and a control electrode, said cathode being disposed within said vacum tube and having a centrally located channel for the insertion of a cathode heater, said cathode further including at least two confronting members each having an emissive coating plated on the outer surface thereof, said control electrode being mounted on spaced relation on said cathode, part of said control electrode including two semi-cylindrical strips extending substantially the length of said apparatus, the remainder of said control electrode including a continuous wire helix wound about said semi-cylindrical strips and making electrical contact therewith, the strands of said helix being directly opposite the emissive surfaces of said cathode, means for fixedly mounting the cathode and control electrode assembly coaxially within said anode, said anode being substantially rectangular in shape and having at least two reentrant surfaces confronting the emissive surfaces of said cathode, means for applying the electrical impulses to one end of said control electrode, whereby the impulses are propagated down the length of the two semi-cylindrical strips, each strand of said helix serving to control the flow of electrons from said cathode-emissive surfaces to the reentrant surfaces of said anode, and means for removing the amplified impulses from said anode.

CHARLES SHEER.

References Cited in the file of this patent

UNITED STATES PATENTS

| Number | Name | Date |
|---|---|---|
| 2,122,538 | Potter | July 5, 1938 |
| 2,433,634 | Stone | Dec. 30, 1947 |
| 2,471,037 | Law | May 24, 1949 |
| 2 545,822 | Loper | Mar. 20, 1951 |